JOHN H. CONLEY.
Improvement in Cultivators.
No. 114,767.    Patented May 16, 1871.
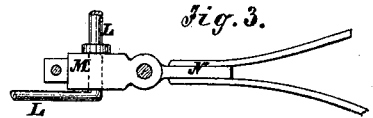
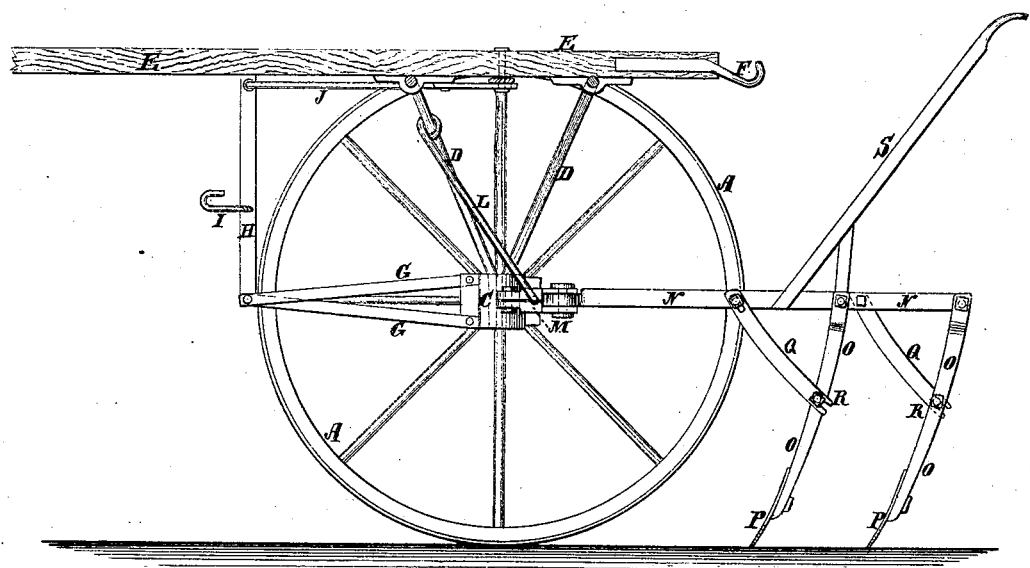
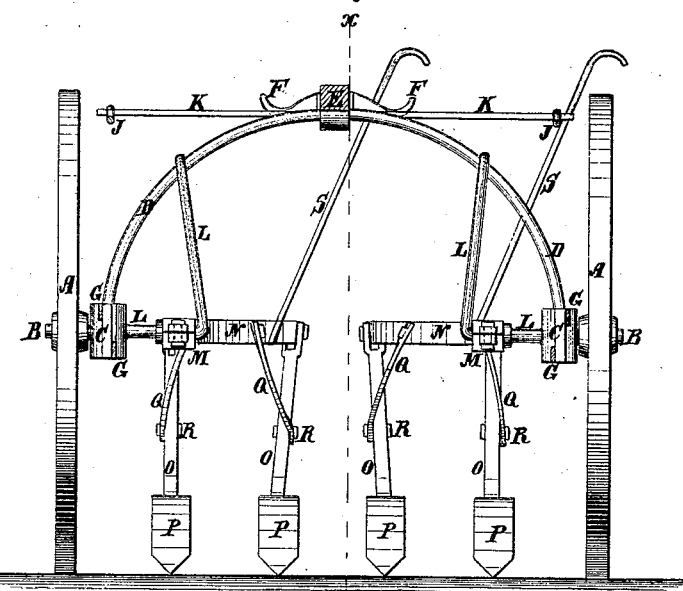

UNITED STATES PATENT OFFICE.

JOHN H. CONLEY, OF MOINGONA, IOWA.

IMPROVEMENT IN CULTIVATORS.

Specification forming part of Letters Patent No. 114,767, dated May 16, 1871.

*To all whom it may concern:*

Be it known that I, JOHN H. CONLEY, of Moingona, in the county of Boone and State of Iowa, have invented a new and useful Improvement in Cultivator; and I do hereby declare that the following is a full, clear, and exact description thereof, which will enable others skilled in the art to make and use the same, reference being had to the accompanying drawing, forming part of this specification, in which—

Figure 1 is a detail vertical section of my improved cultivator, taken through the line *x* *x*, Fig. 2. Fig. 2 is a front view of the same, parts being broken away to show the construction. Fig. 3 is a detail top view of the forward part of the plow-beam and its coupling.

Similar letters of reference indicate corresponding parts.

My invention relates to straddle-row wheeled cultivators, which require a central elevation of the frame to allow the growing plants to pass thereunder and between the plow-plates without injury.

The principle of my invention consists in uniting the strength of two transverse arch-beams to bear the strain between the wheels, while the desideratum of a free space for the plants is preserved. The means which I employ to embody this principle consist in a pair of metallic arches and a single pair of sockets, which receive both the axles and the ends of the arches.

I will now describe my improvement in connection with all the parts of a cultivator to which it is adapted.

A are the wheels, which revolve upon the axle-arms B, the inner ends of which are attached to or formed solid with the sockets C. D are two bows, the ends of which are placed and secured in the sockets C at an angle with each other, as shown in Fig. 1. The upper or middle parts of the bows D are secured to the tongue E, as shown in Figs. 1 and 2. The rear end of the tongue E projects, and has hooks F attached to it, upon which the plows may be hooked and suspended while passing from place to place.

Upon the forward sides of the sockets C are formed flanges, to the upper and lower parts of which are secured the rear ends of the rods or bars G, between the forward ends of each pair of which is bolted the lower end of a bar, H, to the middle part of which is attached a hook, I, to receive the whiffletree.

To the upper ends of the bars H are pivoted the forward ends of the bars J, the rear ends of which are pivoted to the ends of the double-tree K, the middle part of which is pivoted to the tongue E, between the bows D, as shown it Fig. 1. By this construction of the draft device the middle part of the cultivator is left free for the passage of the plants being cultivated.

Upon the rear sides of the sockets C are formed flanges, to which are secured the outer ends of the arms L, which project inward to receive the couplings M, and are then bent upward, and their upper ends are secured to the forward bow, D.

The coupling M is made in two parts, bolted to each other in front and rear of the arm L, part of the bearing for said arm being formed in each of said parts, so that the said coupling may turn vertically upon the said arm L, to give a free vertical movement to the plow-beams N. The forward end of the plow-beam N is pivoted to and between the rear ends of the parts of the coupling M, as shown in Fig. 1, to give a free lateral movement to the plow-beam. The rear part of each plow-beam is branched, said branches being of different lengths, and being spread or bent from each other to bring the two plows connected with each beam into proper position with respect to each other. To the rear end of each branch of each plow-beam is pivoted the upper end of a plow-standard, O, to the lower end of which is attached a plow-plate, P.

Q are brace-bars, the upper ends of which are bolted to the beams N, several holes being made in the said bars Q to receive the said bolts, so that the pitch of the plows may be adjusted at will. The rear ends of the brace-bars Q are slotted or notched, as shown in Fig. 1, to receive the bolts R, by which the said rear ends of the said brace-bars Q are clamped to the standards O.

By this construction, by tightening the bolts upon the nuts R, the brace-bars Q and standards O will be connected together with sufficient force to sustain the ordinary draft-strain in using the cultivator; but should the plows strike an obstruction the standards O will be forced back, drawing the bolts R out of the slots in the rear ends of the brace-bars Q, and allowing the said standards O to turn back upon the pivots at their upper ends, thus guarding them from breakage.

S are the handles, which are attached to the beams N, and are bent to one side, so that the driver walking at the side of the row of plants being cultivated can conveniently guide the plows.

Having thus described my invention, I claim as new and desire to secure by Letters Patent—

The two transverse iron arches D D, fastened together at each end in a common pair of sockets, C C, and diverging upwardly toward the top, combined, as described, with the axles, as and for the purpose specified.

JOHN H. CONLEY.

Witnesses:
C. S. MASON,
A. LA FORREST.